(12) United States Patent
Staeger et al.

(10) Patent No.: US 9,795,151 B2
(45) Date of Patent: Oct. 24, 2017

(54) HYDRATED FAT COMPOSITIONS AND DOUGH ARTICLES

(71) Applicant: GENERAL MILLS, INC., Minneapolis, MN (US)

(72) Inventors: Michael A. Staeger, Minnetonka, MN (US); Jennifer E. Folstad, Blaine, MN (US); Jeffrey F. Enz, Minneapolis, MN (US); Karen Marie Mandl Garrity, St. Louis Park, MN (US); Eric A. Olson, Anoka, MN (US); Jon Duke Seibold, Mahtomedi, MN (US)

(73) Assignee: General Mills, Inc., Minneapolis, MN (US)

( * ) Notice: Subject to any disclaimer, the term of this patent is extended or adjusted under 35 U.S.C. 154(b) by 421 days.

(21) Appl. No.: 14/327,986

(22) Filed: Jul. 10, 2014

(65) Prior Publication Data

US 2014/0322420 A1 Oct. 30, 2014

Related U.S. Application Data

(63) Continuation of application No. 12/017,522, filed on Jan. 22, 2008, now abandoned.
(Continued)

(51) Int. Cl.
*A23D 7/00* (2006.01)
*A21D 2/16* (2006.01)
(Continued)

(52) U.S. Cl.
CPC ............ *A23D 7/001* (2013.01); *A21D 2/165* (2013.01); *A21D 13/16* (2017.01); *A23D 7/003* (2013.01);
(Continued)

(58) Field of Classification Search
CPC .......... A23D 7/00; A23D 7/001; A23D 7/003; A23D 7/0056; A23D 7/02; A21D 2/165
(Continued)

(56) References Cited

U.S. PATENT DOCUMENTS 3,985,911 A 10/1976 Kriz et al.
4,341,813 A 7/1982 Ward
(Continued)

FOREIGN PATENT DOCUMENTS

EP 1 197 153 2/2005
GB 2 350 618 6/2000
(Continued)

OTHER PUBLICATIONS

O'Brien, R. D., Farr, W. E., Wan, P. J., Introduction to Fats and Oils Technology (2nd Edition), (AOCS Press, 2000) available at http://app.knovel.com/hotlink/toc/ id:kpIFOTE00J/introduction-fats-oils/introduction-fats-oils.*
(Continued)

*Primary Examiner* — Jeffrey Mornhinweg
(74) *Attorney, Agent, or Firm* — Rachel A. Kahler; Diederiks & Whitelaw, PLC (57) ABSTRACT

Disclosed are hydrated fat compositions comprising a water-in-oil emulsion comprising (a) a continuous phase comprising: a solid fat comprising a fully-hydrogenated vegetable oil, a stearine fraction of a vegetable oil, or a mixture thereof, in an amount ranging from about 5 wt. % to about 40 wt. % of the hydrated fat; and a low trans-fat liquid vegetable oil in an amount ranging from about 20 wt. % to about 80 wt. % of the hydrated fat composition; (b) a dispersed phase comprising water in an amount ranging from about 5 wt. % to about 60 wt. % of the hydrated fat composition; and (c) an emulsifier.

28 Claims, 3 Drawing Sheets

Related U.S. Application Data (60) Provisional application No. 60/881,799, filed on Jan. 22, 2007.

(51) Int. Cl.
*A23D 7/005* (2006.01)
*A23D 7/02* (2006.01)
*A23L 35/00* (2016.01)
*A21D 13/16* (2017.01)

(52) U.S. Cl.
CPC .............. *A23D 7/0056* (2013.01); *A23D 7/02* (2013.01); *A23L 35/10* (2016.08)

(58) Field of Classification Search
USPC .................................................. 426/602, 604
See application file for complete search history.

(56) References Cited

U.S. PATENT DOCUMENTS

| | | | |
|---|---|---|---|
| 4,568,556 A | 2/1986 | McCoy et al. |
| 4,818,553 A | 4/1989 | Holscher et al. |
| 4,986,992 A | 1/1991 | Glaros et al. |
| 5,190,776 A | 3/1993 | Baumann |
| 5,215,779 A | 6/1993 | Dake et al. |
| 5,290,575 A | 3/1994 | Torikata |
| 5,395,638 A | 3/1995 | Kines et al. |
| 5,407,695 A | 4/1995 | Wheeler et al. |
| 5,578,334 A | 11/1996 | Sundram et al. |
| 5,718,938 A | 2/1998 | Cain et al. |
| 5,843,497 A | 12/1998 | Sundram et al. |
| 5,866,187 A | 2/1999 | Kincs et al. |
| 5,874,117 A | 2/1999 | Sundram et al. |
| 6,033,703 A | 3/2000 | Roberts et al. |
| 6,033,710 A | 3/2000 | Miller et al. |
| 6,068,876 A | 5/2000 | Miller et al. |
| 6,423,363 B1 | 7/2002 | Traska et al. |
| 6,544,579 B1 | 4/2003 | Landon |
| 6,630,172 B2 | 10/2003 | Batarseh |
| 6,863,915 B2 | 3/2005 | Huxel |
| 7,229,653 B2 | 6/2007 | Sundram et al. |
| 2002/0119240 A1 | 8/2002 | Mazurek et al. |
| 2003/0161935 A1 | 8/2003 | Kakuda et al. |
| 2005/0042332 A1 | 2/2005 | Lonergan |
| 2005/0123668 A1 | 6/2005 | Kodali et al. |
| 2005/0233056 A1 | 10/2005 | Jahaniaval |
| 2005/0249855 A1 | 11/2005 | Marangoni et al. |
| 2005/0249856 A1 | 11/2005 | Marangoni et al. |
| 2005/0276900 A1 | 12/2005 | Ullanoormadam |
| 2006/0019021 A1 | 1/2006 | Plank et al. |
| 2006/0105092 A1 | 5/2006 | Miller |

FOREIGN PATENT DOCUMENTS

| | | |
|---|---|---|
| WO | WO-92/15200 | 9/1992 |
| WO | WO-03/080779 | 10/2003 |
| WO | WO-2004/108874 | 12/2004 |
| WO | WO-2005/012471 | 2/2005 |
| WO | WO-2006/014322 | 2/2006 |
| WO | WO-2006/133124 | 12/2006 |
| WO | 2015/097417 | 7/2015 |

OTHER PUBLICATIONS

Shahidi, "Oils Used in Vegetable Oil Margarines and Spreads", Bailey's Industrial Oil and Fat Products, 6th Edition, vol. 4, Edible Oil and Fat Products: Products and Applications, p. 51-56.

Steidley et al., "Determination of Solid Fat by Dilatometry and Pulsed Nuclear Magnetic Resonance", AGFD (AOCS): Edible Applications of Edible Oils, https://acs.confex.com/acs/36glrm/techprogram/P9209.HTM (May 29, 2014).

\* cited by examiner

Solid Fat Content (SFC) of Hydrated Fat Composition of Table 2-1 versus Margarines Margarine SFC data taken from the "Proceedings of the World Conference on Oilseeds Technology and Utilization, Thomas H. Applewhite (1993, AOCS press)

HYDRATED FAT COMPOSITIONS AND DOUGH ARTICLES

CROSS-REFERENCE TO RELATED APPLICATIONS

This application is a continuation of U.S. patent application Ser. No. 12/017,522, filed Jan. 22, 2008, which claims the benefit of U.S. Provisional Application Ser. No. 60/881,799, filed Jan. 22, 2007 and entitled "Hydrated Fat Compositions and Dough Articles", the disclosure of which is incorporated herein by reference.

BACKGROUND

Laminated dough products are prepared from dough comprising a plurality of thin dough layers that are separated from one another by thin continuous layers of a laminating fat. When the laminated dough is baked, the individual layers of dough separate from one another due to the presence of the fat layers to provide a plurality of thin baked dough layers. This layered structure is associated with a very desirable light, delicate, and flaky texture. Well known examples of laminated dough products include biscuits, crescents, croissants, puff pastry, Danish, cinnamon rolls, turnovers, rolls, strudel, breadsticks, and corn sticks.

The formation of laminated dough is typically accomplished by a process of applying a pre-crystallized and packaged laminating fat onto the surface of a dough layer and repeatedly folding and sheeting the dough in order to form a laminated dough structure. In order to form laminated dough using this technique, the properties of the laminating fat are important. Specifically, the laminating fat must be capable of plastic behavior so that it can be drawn down into thinner and thinner layers as the laminated dough is successively folded and sheeted to form the laminated structure. If, for example, the fat is too soft, it will be absorbed into the dough and the layers will not separate upon baking. If the fat is too hard, the dough may tear when sheeted or may distribute unevenly in the laminated dough product.

Traditionally, laminated dough has been prepared using animal fat (e.g. butter) as the source of the fat. Butter is costly and is not robust to commercial processing without significant risk to emulsion breakdown. Health and nutrition concerns with animal fats center on saturated fat and cholesterol content. Another known approach has been to use compositions comprised of partially hydrogenated vegetable oils. These materials, however, not only contain saturated fat, but also an undesirable amount of trans fatty acids. Trans fatty acids also have negative health implications.

One method of lowering the trans fatty acid content of a laminated dough product is to use a hydrated laminating fat. The water in the hydrated laminating fat acts to lower the overall trans fat acid content by replacing some of the trans fat that would otherwise be present. However, when laminated doughs are held refrigerated or frozen for an extended time period before being baked, moisture management in the dough is critical to assure expected dough handling and finished product characteristics. For example, if moisture is not properly emulsified with the fat, the emulsion may breakdown causing water to be released into the dough. Because of the need to control moisture, laminated doughs prepared for extended storage requirements are typically prepared using anhydrous laminating fats.

In view of the foregoing, what is desired is a hydrated laminating fat that can be used in laminated dough products, where the laminating fat has a low level of trans fatty acids and a low to moderate level of saturated fatty acids. Also desirable is a hydrated laminating fat that can be used in laminated dough products that are designed to be held for an extended period in an unbaked state at refrigerator or freezer temperatures with properties comparable to an anhydrous laminating fat. Further, if the functionality of the laminating fat can be extended so that less fat is required, this is desirable from health, nutrition and economic perspectives.

SUMMARY

The present invention provides hydrated fat compositions that are low in trans-fatty acids (<0.5 grams/serving) and have a moderate to low level (<about 30 wt. %) of saturated fatty acids. In many embodiments, the hydrated fat compositions are useful as a roll-in fat in laminated doughs, such as those used in biscuits, crescent and other flaky type dinner rolls, croissants, puff pastry, and Danish, cinnamon rolls, turnovers, rolls, strudel, breadsticks, corn sticks. In exemplary embodiments, the hydrated fat compositions are useful as laminating fats for use in laminated dough products that are designed to be prepared and held at refrigerator or freezer temperature for an extended time period prior to baking. For example, the laminated dough products may be refrigerated for about 75 days or more, or about 120 days, or may be frozen for about 2 months or more, or about 8 months or more, prior to baking without loss of properties.

As used herein the term "hydrated" refers to a fat composition comprising water that is in the form of a water-in-oil emulsion. As used herein the term "laminating fat" refers to a fat composition that is plastic at room temperature. As used herein "saturated fatty acids" refers to fatty acids that contain no carbon-carbon double bonds in the acyl chain of the fatty acid. Examples include stearic acid and palmitic acid. As used herein the term "trans fatty acid" refers to unsaturated fatty acids that contain one or more isolated (i.e., nonconjugated) double bonds in a trans configuration (see, e.g., 21 C.F.R. §101).

In one aspect, the invention provides a hydrated fat composition comprising a water-in-oil emulsion comprising:
(a) a continuous phase comprising:
   a solid fat comprising a fully-hydrogenated vegetable oil, a stearine fraction of a vegetable oil, or a mixture thereof, in an amount ranging from about 5 wt. % to about 40 wt. % (more typically 20 wt. % to 30 wt. %) of the hydrated fat; and
   a low trans fatty acid liquid vegetable oil in an amount ranging from about 20 wt. % to about 80 wt. % of the hydrated fat composition;
(b) a dispersed phase comprising water in an amount ranging from about 5 wt. % to about 50 wt. % of the hydrated fat composition; and
(c) an emulsifier.

In some embodiments, the solid fat component of the hydrated fat composition is a fully-hydrogenated vegetable oil, for example, fully-hydrogenated cottonseed oil, fully-hydrogenated soybean oil, fully-hydrogenated palm oil, fully-hydrogenated palm kernel oil, fully-hydrogenated coconut oil, and mixtures thereof. Fully-hydrogenated vegetable oils typically have an iodine value of about 10 or less or about 5 or less. In other embodiments, the solid fat component of the hydrated fat composition comprises a stearine fraction of a vegetable oil, for example, soybean oil stearine, cottonseed stearine, palm stearine, and mixtures thereof.

The liquid fat component is a low-trans fatty acid liquid vegetable oil. Low trans fatty acid vegetable oils typically have about 5% wt. or less trans fatty acids. These liquid oils typically are not hydrogenated in order to avoid the formation of trans fatty acids that results during the hydrogenation process. Examples of low trans fatty acid vegetable oils include canola oil, corn oil, cottonseed oil, olive oil, palm oil, rapeseed oil, rice bran oil, safflower oil, soybean oil, sunflower oil, or mixtures thereof. Desirably, the low-trans fatty acid property of the laminating fat of the invention allows finished food products (e.g., dough products) to be formulated such that they have a trans fatty acid level that does not exceed 0.5 grams of trans fatty acid per serving of the finished food product.

The emulsifier is present to stabilize the water phase in the form of a water-in-oil emulsion. Examples of emulsifier include alpha-monoglyceride stearate (AMGS), sorbitan monostearate, diacetyl tartaric acid esters of monoglycerides (DATEM), polyglycerol monostearate (PGMS), polyglycerol polyricinoleate (PGPR), propylene glycol monoesters, sucrose esters, monos/dis, SSL, lecithin, phospholipids, polysorbate esters, monoglyceride blends, or combinations thereof. In some embodiments, the emulsifier is present in an amount ranging from about 1 wt. % to about 10 wt. %, or from about 1 wt. % to about 5 wt. %. The emulsifier can be selected to provide desired properties to the hydrated fat composition. For example, the emulsifier type and amount may be used to control, for example, hardness, emulsion stability, and texture of the hydrated fat composition.

In a preferred embodiment, the hydrated fat composition comprises a water-in-oil emulsion comprising: (a) about 20 wt. % to about 30 wt. % of a solid fat comprising fully-hydrogenated cottonseed oil; (b) about 60 wt. % to about 70 wt. % of liquid oil comprising soybean oil; (c) about 1.0 wt. % to about 3.0% wt. of an emulsifier comprising alpha-monoglyceride stearate; and (d) about 5 wt. % to about 20 wt. % water.

In another aspect, the invention provides food compositions comprising the hydrated fat composition of the invention. Examples of food compositions include flour-based doughs. In some embodiments the hydrated fat is used in a laminated dough comprising a plurality of layers of a dough composition; and a plurality of layers of the hydrated fat composition. The layers of the dough composition are each separated by a layer of the hydrated fat composition. Laminated dough compositions are useful for preparing biscuits, crescents, croissants, puff pastry, Danish, cinnamon rolls, turnovers, rolls, strudel, breadsticks, corn sticks.

Accordingly, in another aspect, the invention provides a method of making a laminated dough comprising the steps of:

(a) combining a solid fat, a liquid fat, water, and an emulsifier to form a hydrated fat composition in the form of a water-in-oil emulsion comprising:
 (i) a continuous phase comprising:
  a solid fat comprising a fully-hydrogenated vegetable oil, a stearine fraction of a vegetable oil, or a mixture thereof, in an amount ranging from about 5 wt. % to about 40 wt. % of the hydrated fat; and
  a low trans-fat liquid vegetable oil in an amount ranging from about 20 wt. % to about 80 wt. % of the hydrated fat composition;
 (ii) a dispersed phase comprising water in an amount ranging from about 5 wt. % to about 50 wt. % of the hydrated fat composition; and
 (iii) an emulsifier;
(b) cooling and crystallizing the hydrated fat composition; and
(c) applying a layer of the hydrated fat composition to a layer of a dough composition comprising flour and water; and
(d) folding the dough layer and hydrated fat layer one or more times to form a dough article comprising alternating layers of the dough composition and the hydrated fat.

Advantageously, in some embodiments, the hydrated fat compositions of the invention may be prepared and used in laminated dough without going through a tempering step. Tempering refers to the process where a fat composition is conditioned at a desired temperature for a desired period of time in order to promote crystal formation in the fat. Since the hydrated fat compositions of the invention do not require tempering to display plastic behavior, they are suitable for use in a continuous process where the hydrated fat is prepared and flows directly (i.e., without a tempering step) to the fat applicator (e.g., a fat horn) where it is applied to a surface of a dough composition.

BRIEF DESCRIPTION OF THE DRAWINGS

The invention will be described further in connection with the attached drawings wherein.

DETAILED DESCRIPTION

In one aspect, the invention provides a hydrated fat composition comprising a water-in-oil emulsion comprising:
(a) a continuous phase comprising:
 a solid fat comprising a fully-hydrogenated vegetable oil, a stearine fraction of a vegetable oil, or a mixture thereof, in an amount ranging from about 5 wt. % to about 40 wt. % of the hydrated fat; and
 a low trans-fat liquid vegetable oil in an amount ranging from about 20 wt. % to about 80 wt. % of the hydrated fat composition;
(b) a dispersed phase comprising water in an amount ranging from about 5 wt. % to about 50 wt. % of the hydrated fat composition; and
(c) an emulsifier.

The components making up the hydrated fat of the invention are described in detail below.

Solid Fat Component or Hardstock:

Hydrated fat compositions of the invention comprise a hardstock or solid fat component. By hardstock or solid fat it is meant that the fat is a solid at or near room temperature. The solid fat typically comprises glycerides of fatty acids (e.g., monoglycerides, diglycerides, and triglycerides). The glycerides have a fatty acid composition that comprises a very high percentage of saturated fatty acids. The solid fat component is typically very low in trans-fatty acids, since only a very few of the fatty acids have residual sites of unsaturation.

In some embodiments, the solid fat is produced by hydrogenating the unsaturated fatty acids that are present in a vegetable oil in order to increase the amount of saturated fatty acids. Techniques for hydrogenation of vegetable oils are known in the art and include, for example, reacting a vegetable oil having unsaturated fatty acids with hydrogen gas in the presence of a hydrogenation catalyst, for example, a supported nickel catalyst. The hydrogenated vegetable oil is typically fully-hydrogenated in order to achieve an iodine value (IV) of about 10 or less, more typically about 5 or less. Representative hydrogenated solid fats include hydrogenated cottonseed oil, hydrogenated soybean oil, hydrogenated palm oil, palm oil, fully-hydrogenated palm kernel oil, fully-hydrogenated coconut oil, and mixtures thereof.

In some embodiments, the solid fat comprises the stearine fraction of a vegetable oil. A stearine fraction refers to a fraction of a vegetable oil that has a fatty acid composition that is high in stearic acid (i.e., a C18 saturated fatty acid) and palmitic acid (i.e., a C16 saturated fatty acid). Stearine fractions may be obtained by fractionization of a vegetable oil composition, which separates the higher-melting solid fraction (stearine) from the lower-melting liquid fraction (olein). Representative vegetable oil stearine fractions that may be used include cottonseed stearine, soybean stearine, and palm stearine.

Useful hardstock solid fats typically have a melting point ranging from about 122° F. (50° C.) to about 176° F. (80° C.), more typically ranging from about 140° F. (60° C.) to about 158° F. (70° C.). The hardstock or solid fat is typically present in the hydrated fat of the invention in an amount ranging from about 5 wt. % to about 40 wt. %. In exemplary embodiments, the solid fat is present in an amount ranging from about 20 wt. % to about 30 wt. %. For example, the solid fat may be fully-hydrogenated cottonseed oil, which is present at 25 wt. % of the hydrated fat composition. Suitable hydrogenated cottonseed oil can be obtained commercially under the trade designation "DRITEX C FLAKES" (from ACH Food Companies, Inc.). This fully-hydrogenated cottonseed oil has a melting point of about 148° F. (64.4° C.) and an iodine value of about 5 or less.

Liquid Fat or Oil:

Hydrated fat compositions of the invention comprise liquid oil. By liquid oil it is meant that the oil is a liquid when it is at or near room temperature. Useful liquid oils comprise glycerides (e.g., monoglycerides, diglycerides, and triglycerides) that have a fatty acid composition that is low in trans-fatty acids and low in saturated fatty acids. For example, the liquid fat may comprises about 4% or less trans-fatty acids, for example, about 3% or less, about 2% or less, or about 1% or less.

Examples of useful liquid oils include canola oil, corn oil, cottonseed oil, olive oil, palm oil, rapeseed oil, rice bran oil, safflower oil, soybean oil, and sunflower oil. In order to avoid the introduction of trans-fatty acids, the liquid oil is not hydrogenated. The liquid oil is typically present in the hydrated fat in an amount ranging from about 20 wt. % to about 80 wt. %. In exemplary embodiments, the liquid oil is present in an amount ranging from about 50 wt. % to about 70 wt. %, or about 60 wt. % to about 70 wt. %. Liquid oils may be obtained, for example, from Bunge Foods, Golden Brands, Sunlight Foods, ADM, AC Humko Corporation (e.g., TRI-SUN high oleic sunflower oil), Cargill, Incorporated (e.g., ODYSSEY Canola Oil and CLEAR VALLEY 65 and 75 high oleic canola oil), Canamera Foods, and RITO (e.g., high oleic safflower oil and high oryzanol rice bran oil).

Emulsifier:

Hydrated fat compositions of the invention are water-in-oil type emulsions comprising a dispersed phase that comprises water and a continuous phase that comprises the solid fat and the liquid oil. The hydrated fat compositions comprise an emulsifier that functions to emulsify the water so that it is present in the form of a plurality of small water droplets that are distributed throughout the continuous phase of the hydrated fat. The choice of emulsifier may affect the final properties of the hydrated fat including, for example, emulsion stability, hardness, texture, and consistency of properties over various tempering conditions.

Useful emulsifiers for water-in-oil emulsions typically have an HLB (i.e., a hydrophillic/lipophilic balance) that ranges from about 3 to about 6, although emulsifiers having an HLB outside of this range may also be useful. Examples of useful emulsifiers include alpha-monoglyceride stearate (AMGS), sorbitan monostearate, diacetyl tartaric acid esters of monoglycerides (DATEM), polyglycerol monostearate (PGMS), polyglycerol polyricinoleate (PGPR), propylene glycol monoesters, sucrose esters, monos/dis, SSL, lecithin, phospholipids, polysorbate esters, monoglyceride blends, or combinations thereof. The emulsifier is typically present in an amount ranging from about 0 wt. % to about 10 wt. %, or from about 1 wt. % to about 5 wt. %, or from about 1 wt. % to about 3 wt. %.

In hydrated fats of the invention, AMGS has been found to produce fats that are hard, uniform in appearance, and consistent across various tempering conditions. AMGS is commercially available under the trade designation "PANALITE 90-03" and "PANALITE 90-03 PK" (from Archer Daniels Midland Co.). In exemplary embodiments, the emulsifier is AMGS that is present in an amount of about 1 wt. % to about 5 wt. %, or about 1 wt. % to about 3 wt. % of the hydrated fat composition.

Water:

Hydrated fat compositions of the invention comprise water that is present in the form of a dispersed phase comprising a plurality of small water droplets. Water is typically present in an amount of about 5 wt. % to about 50 wt. %. In exemplary embodiments, the hydrated fat compositions comprise about 5 wt. % to 30 wt. % water, more typically about 5 wt. % to about 15 wt. % water.

Optional Ingredients:

Hydrated fat compositions of the invention may optionally include such ingredients as an antimicrobial agent (e.g., potassium sorbate; sodium benzoate); an antioxidant (e.g., TBHQ); salt, color, flavor, vitamins, etc.

Properties of Laminating Fat:

Embodiments of the hydrated fat compositions of the invention display plastic behavior making them suitable for use as laminating fat compositions in laminated dough compositions. Specifically, the laminating fat must be capable of plastic behavior so that it can be drawn down into thinner and thinner layers as the laminated dough is successively folded and sheeted to form the laminated structure. If, for example, the fat is too soft, it will be absorbed into the dough and the layers will not separate upon baking. If the fat is too hard, the dough may tear when sheeted.

Useful hydrated fat compositions have a hardness value of about 3 kg to about 18 kg, or from about 5 kg to about 14 kg, when measured using the margarine spreadability test using a texture analyzer (TA-XTplus). Hardness can also be measured using the AOCS cone penetrometer method (Cc 16-60) with a hardness values ranging from about 30 mm to 220 mm, or from about 80 mm to about 140 mm.

Figure 3:
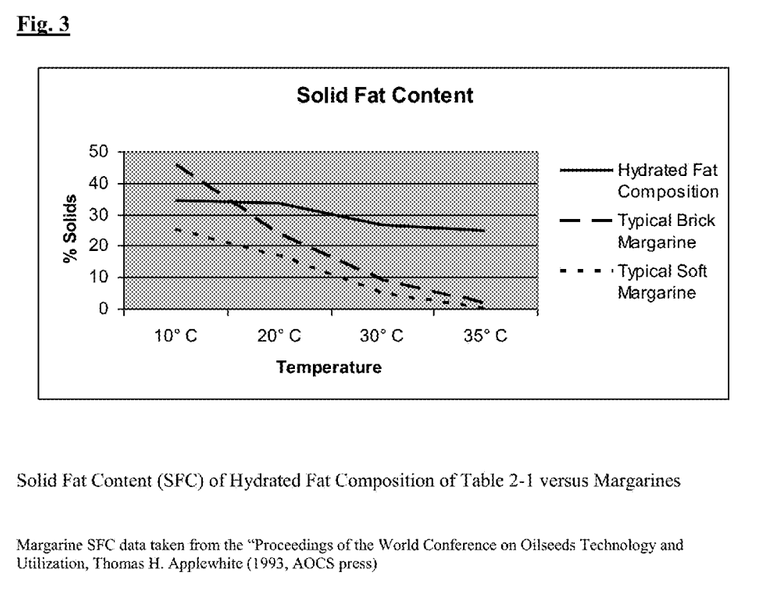
FIG. 3 is a graph of the solid fat content (SFC) of a hydrated fat composition of the invention (see, Table 2-1) as compared to typical margarine compositions. Solid fat content (% solids) is displayed on the y-axis and temperature (° C.) is displayed on the x-axis.

In some embodiments, the hydrated fat compositions of the invention display a solid fat content (SFC) versus temperature profile that has a lower rate of change (i.e., a flatter profile) with temperature when compared to typical margarine compositions. This can be seen in FIG. 3 which shows a SFC versus temperature profile for a hydrated fat composition of the invention (see, Table 2-1) as compared to two typical margarine compositions. As shown in FIG. 3, the hydrated fat composition of the invention has a significantly higher percentage of solid fat at 95° F. (35° C.) as compared to the margarine compositions. A higher percentage of solid fat at 95° F. (35° C.) may cause the hydrated fat compositions of the invention to display a somewhat waxier mouthfeel than is typical of margarine. Despite this characteristic, however, the hydrated fat compositions of the invention function well as "low/no trans" laminating fats under high speed production of commercial baked goods.

Dough Articles:

The hydrated fats of the invention may be used to prepare laminated dough articles. For example, laminated dough articles are often prepared by the steps of: (a) providing a hydrated fat composition of the invention; (b) applying a layer of the hydrated fat composition to a layer of a dough composition comprising flour and water; and (c) repeatedly folding and compressing (sheeting) the dough layer and hydrated fat layer to form a laminated dough comprising alternating layers of dough composition and hydrated fat.

Laminating fats are selected, inter alia, for their ability to match the material characteristics of the dough composition that they are being used with. Desirable laminating fats are both firm and yielding, thereby having a plasticity that approximately matches the dough that is being laminated. If a laminating fat is too soft, it will flow from the dough during the laminating process. If a laminating fat is too firm, it will tear the dough or will flow unevenly across a layer of the dough during lamination. Laminating fats preferably maintain the desired characteristics throughout the laminating process where the dough is repeatedly folded and sheeted to achieve a decrease its thickness. After preparation of the laminated dough article, the laminating fat needs to maintain its layer integrity throughout the expected shelf life of the dough article, and during the initial phase of baking. If it does not, then the dough article may suffer from a loss of desirable properties.

Conventionally, many laminated dough articles that are designed to be refrigerated or frozen in an unbaked state prior to baking are prepared using anhydrous laminating fats in order to minimize any undesirable effects that may result from moisture migration from a hydrated laminating fat to the dough during the refrigerated or frozen storage. It has been found that hydrated laminating fats of the invention may be used to make acceptable laminated dough articles that can be stored in a refrigerator or freezer for an extended period of time prior to baking without suffering significant loss of properties due to moisture migration. For example, in some embodiments, the laminated dough articles of the invention can be refrigerated (e.g., at a temperature of about 35° F. (1.7° C.) to about 45° F. (7.2° C.)) for an extended time period prior to baking (e.g., about 75 days or more, or about 120 days or more) without degradation in dough properties, for example, layer lamination, product differentiation/identity, excessive product stickiness, decreased baked volume, and misshapen product after baking. Refrigerated canned laminated dough products have specific desired dough properties. In biscuits when the can is opened the dough should be easy to remove and the individual biscuits should be easy to identify and separate. In crescent you should be able to easily un-roll the dough and separate the individual crescents. Poor performing biscuits show no definition between individual biscuits, poor biscuit formation, and sticky dough. Poor performing crescents are difficult to un-roll due to dough stickiness and difficult to separate due to increased dough extensibility. In some embodiments, the laminated dough articles of the invention may be frozen (e.g., at a temperature of about ≤$^-$10° F. (−23.3° C.)) for about 2 months or more, or about 8 months or more prior to baking without degradation in dough properties such as decreased bake volume, loss of layer integrity, and misshapen product after baking.

In contrast to margarine and butter, the laminating fat compositions of the invention have improved processing tolerance when subjected to high temperature and high shear. This allows the laminating fats of the invention to be used in high speed automated dough making processes such as the processes that are used to make refrigerated or frozen dough products. Margarine and butter also do not qualify as healthy fats in terms of the level of trans fatty acid and saturated fatty acids that are present. Embodiments of hydrated fats of the invention will process in refrigerated and/or frozen dough and meet the trans labeling requirements without significant increases in saturated fat.

Method of Making Hydrated Fat:

In order to prepare a hydrated fat composition of the invention, the desired amount of liquid oil (e.g., canola oil) is heated to a temperature of about 122° F. (50° C.) to about 158° F. (70° C.). Next, the required amount of water is added to the liquid oil and the resulting composition is mixed at a high shear rate. Separately, the solid fat component (e.g., cottonseed stearine) is melted and the required amount of melted solid fat is added to the liquid oil/water composition while mixing at a high shear rate. The required amount of emulsifier (e.g., AMGS) may be melted along with the solid fat component or may be dissolved in the water phase and added with the water portion of the formulation. After mixing the fat components, the water (optionally including the emulsifier) is then added to the fat mixture and the resulting composition is mixed at a high shear rate to form a blend.

After forming the blend, the blend may then be fed into a scraped surface heat exchanger where heat is removed in order to cause crystallization of the fat. In some embodiments, one or more scraped surface heat exchangers are sequenced in series in order to process the hydrated fat. A useful scraped surface heat exchanger is commercially available under the trade designation "KOMBINATOR" (from Schröder) Other useful scraped surface heat exchangers are available under the trade designation "VOTATOR" (from SPX Process Equipment Co.).

Optionally, after processing through the scraped surface heat exchanger(s), the resulting composition may be then fed through one or more pin workers. A pin worker is essentially a hollow cylinder having finger-like projections extending from the walls in multiple locations. A rotating rod is centrally positioned within the pin worker and tines or fingers projecting from the rod intermesh with those extending from the walls to provide a mixing action when the central rod is rotated. The pin worker functions to modify the crystalline form of the hydrated fat of the invention.

Figure 1:
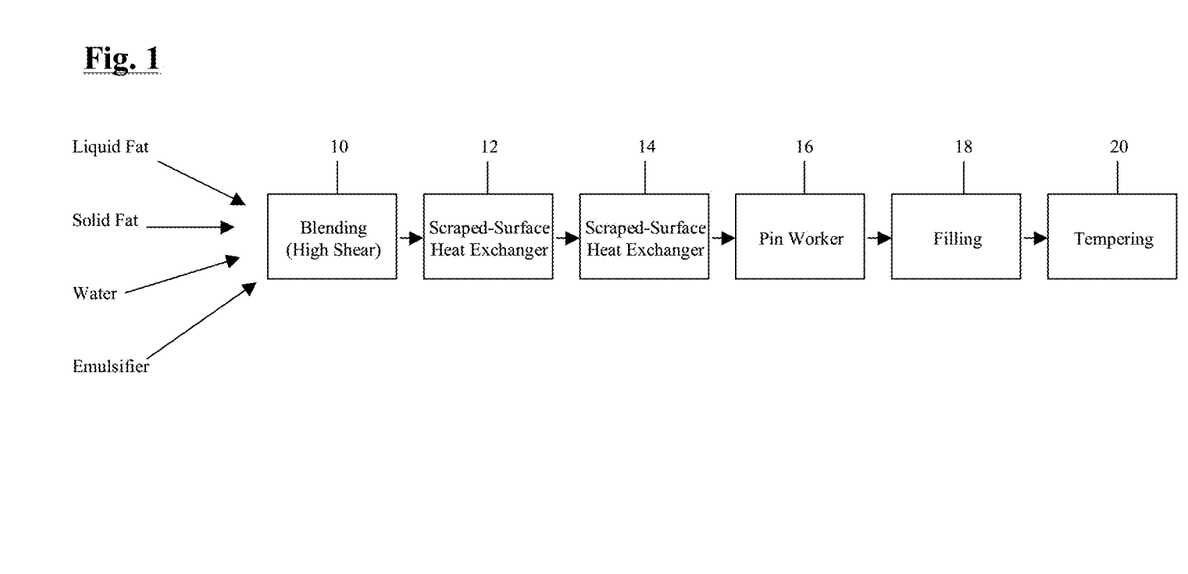
FIG. 1 is a schematic representation of a process for making a hydrated fat of the invention.

After processing though the pin worker, the resulting hydrated fat composition is transferred into a container (e.g., a lined cardboard box) for tempering, storage, and/or shipment purposes. In some embodiments, the hydrated fat composition is tempered by exposing the hydrated fat to a defined temperature for a defined time period. Tempering is useful for setting the desired crystal structure in the hydrated fat composition. In some embodiments, tempering is conducted at a temperature ranging from about 59° F. (15° C.) to about 86° F. (30° C.) for several hours to several days (e.g., 24 hours to 14 days). A schematic process flow diagram is presented in FIG. 1 where 10 identifies the high-shear blending operation, 12 and 14 identify two scraped surface heat exchangers positioned in series, 16 identifies the pin-worker, 18 identifies the filling operation, and 20 identifies the tempering operation.

In one embodiment, the hydrated fat composition is fed directly from the pin worker to a dispensing apparatus for delivery of the hydrated fat directly onto a layer of a dough composition in an automated dough-making process. Optionally, the fat would move from the scrape-surface heat exchanger directly to dough application. Some further crystallization can be achieved by using a resting tube in place of the pin worker. Advantageously, hydrated fat compositions of the invention can be fed directly from the pin worker, scrape-surface heat exchanger or resting tube to the dispensing apparatus without the need for a separate tempering step. This allows a continuous process to be conducted where the ingredients making up the hydrated fat composition are mixed together and the resulting mixture is fed through one or more scraped surface heat exchangers and a pin-worker to form the hydrated fat. Following the pin-worker, scrape-surface heat exchanger or resting tube the hydrated fat is fed directly (i.e., without a tempering step) to a dispensing device (e.g., fed through a jacketed tube and fat horn) for application to a layer of a dough composition. That is, the hydrated fat flows continuously from the pin-worker, scrape-surface heat exchanger or resting tube to the dispensing device where it is dispensed onto a dough composition. Typically, the time period from the pin-worker, scrape-surface heat exchanger, or resting tube to the dispensing device is about 15 minutes or less, or about 5 minutes or less.

Figure 2:
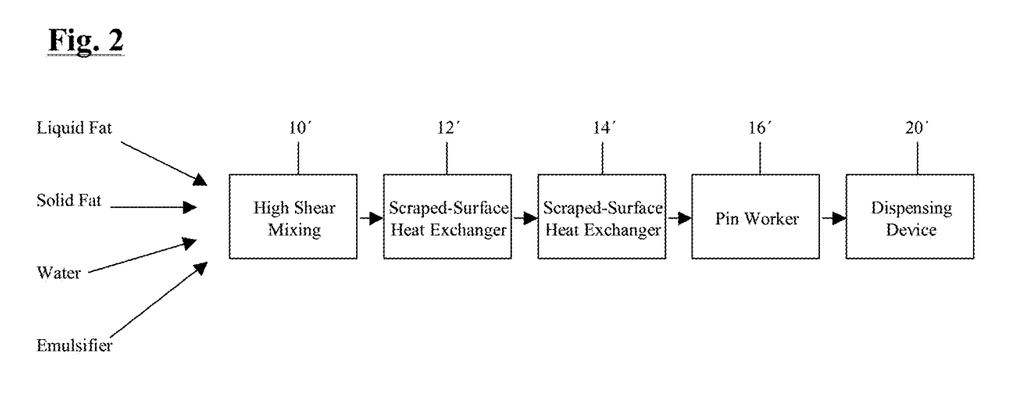
FIG. 2 is a schematic representation of a process for making and applying a hydrated fat composition of the invention.

FIG. 2 is one schematic representation of this process where 10' represents the high shear rate mixing operation, 12' and 14' represent two scraped surface heat exchangers positioned in series, 16' represents the pin-worker, and 20' represents the dispensing device where the hydrated fat composition is applied to a layer of a dough composition. The hydrated fat flows in continuous fashion from pin-worker 16' to dispensing device 20'.

The following examples are presented to illustrate the present invention and to assist one of ordinary skill in making and using the same. The examples are not intended in any way to limit the scope of the invention.

EXAMPLES

Example 1

A hydrated fat composition of the invention was prepared as described below.
1. A jacketed 30-gallon reaction vessel was charged with 64,000 grams of canola oil and the canola oil was heated to a temperature of 122° F. (50° C.).
2. 10,000 grams of water was added to the heated canola oil and the composition was mixed using a high shear mixer (in-line IKA mixer) to ensure good dispersion of the water in the canola oil.
3. 25,000 grams of fully hydrogenated cottonseed oil and 1000 grams AMGS emulsifier were charged to a separate melt-kettle and were melted to form a liquid.
4. The mixture of cottonseed oil and AMGS was pumped as a liquid into the 30-gallon reactor containing the canola oil and water mixture.
5. The resulting emulsion was heated to 140° F. (60° C.) to 158° F. (70° C.) and was transferred by a pump to a scraped surface heat exchanger and pin-worker unit ("KOMBINATOR" from Schröder) for cooling and crystallization. The process conditions are summarized below.

Oil Inlet Temperature of Scraped surface Heat Exchanger=140°-158° F. (60°-70° C.)

Speed of Scraped surface Heat Exchanger=600-800 rpm (High)

Speed of Pin-worker=200-400 rpm (Low)

Discharge Temperature from Pin-worker=64.4°-69.8° F. (18°-21° C.)

Flow rate=110-200 lbs/hr (High)

Back Pressure=100-200 psi (Med-High)

Fat Collection Temperature=78.8°-86° F. (26-30° C.)

6. The resulting hydrated fat was collected in plastic-lined 50 lb. cardboard boxes and was tempered at 158° F. (70° C.).

Example 2

A hydrated fat composition of the invention was prepared using the formulation listed in TABLE 2-1. After mixing the ingredients together, the hydrated fat was processed (i.e., votated) through a series of two scraped surface heat exchangers (A1, A2) that fed into a pin worker (B1). The votation conditions are provided in TABLE 2-2. The physical properties of the hydrated fat are provided in TABLE 2-3.

TABLE 2-1

Hydrated Fat Composition

| Ingredient | Amount % |
| --- | --- |
| Soybean Oil | 62.88 |
| Fully Hydro Cottonseed Oil | 25.00 |
| Distilled Mono's (Panalite 90-03K) | 2.00 |
| Sodium benzoate | 0.1% |
| TBHQ | 0.02 |
| Water | 10.00 |

TABLE 2-2

Votation Conditions - Configuration A + A + B→Fill

| Parameter | | | | | |
| --- | --- | --- | --- | --- | --- |
| | Condition #1 | Condition #2 | Condition #3 | Condition #4 | Condition #5 |
| | Feed Temp | | | | |
| | 161.3° F. (71.8° C.) | 164.7° F. (73.7° C.) | 164.7° F. (73.7° C.) | 147.6° F. (64.2° C.) | 170° F. (76.6° C.) |
| A1 (F) | 90 | 91.0 | 78.0 | 91.1 | 93 |
| A1 (rpm) | 800 | 800 | 800 | 800 | 800 |
| A2 (F) | 85 | 91.0 | 76 | 83.3 | 82 |
| A2 (rpm) | 400 | 400 | 400 | 400 | 250 |
| B2 (rpm) | 200 | 110 | 200 | 200 | 200 |
| B2 (F) | 100 | 100 | 90 | 100 | 94.6 |
| Rate (lbs./hour) | 250 | 250 | 250 | 280 | 200 |
| Back Pressure (bar) | 10-15 | 4 | 22 | 19 | 9 |

TABLE 2-3

| Analysis | Hydrated Fat |
| --- | --- |
| Mettler Drop Point (° F.) | 135.5 |
| SFC @ 50° F (10° C.) | 34.42 |
| SFC @ 70° F (21.1° C.) | 31.65 |
| SFC @ 80° F (26.7° C.) | 29.41 |
| SFC @ 92° F (33.3° C.) | 26.27 |
| SFC @ 100° F (37.8° C.) | 23.44 |
| SFC @ 104° F (40° C.) | 21.52 |
| Moisture (%) | 9.55 |
| Salt (%) | 0 |
| % Total C16:0 FA | 14.24 |
| % Total C18:0 FA | 24.27 |
| % Total C18:1 trans FA | 0.09 |
| % Total C18:1 cis FA | 16.26 |
| % Total C18:2 trans FA | 0.24 |
| % Total C18 2 cis FA | 37.11 |
| % Total C18:3 trans FA | 0.19 |
| % Total C18:3 cis FA | 5.00 |
| % Total Saturated FA | 39.83 |
| % Total trans FA | 0.51 |

Example 3: Emulsifier Study

Hydrated fat compositions were prepared according to the formula in TABLE 3-1. The emulsifiers that were evaluated are provided in TABLE 3-2.

TABLE 3-1

| Ingredient | Amount (wt. %) |
| --- | --- |
| High Oleic Canola Oil | 68 |
| Cottonseed Stearine | 20 |
| Water | 10 |
| Emulsifier | 2 |

TABLE 3-2

| Type | Description |
| --- | --- |
| AMGS | Alpha-monoglyceride stearate |
| PGMS | Polyglycerol monostearate |
| Panodan 150K | Diacetyl tartaric acid esters of mono glycerides (DATEM) |
| Dimodan HP K-A | Alpha-monoglyceride palmitate |

The hydrated fat compositions were prepared as follows:
1. The ingredients were weighed out.
2. The canola oil was heated to 122° F. (50° C.).
3. The water was added to the heated canola oil and the composition was mixed at high shear.
4. The cottonseed stearine was melted and was slowly added to the composition while mixing at high shear.
5. The emulsifier was melted and was slowly added to the composition while mixing at high shear.
6. The resulting hydrated fat composition was split into three samples for tempering. The samples were tempered at the following conditions.
   1 sample at 60° F. (15.5° C.) for 4 days
   1 sample at 70° F. (21.1° C.) for 4 days
   1 sample at 85° F. (29° C.) for 4 days Hardness Measurement:

Hardness measurements were taken on the hydrated fat compositions using a Texture Technologies TA.XT.plus Texture Analyzer. The margarine application for the spreadability/softness of margarine was used. The samples were packed into the cups and run at room temperature (~70° F.) (21.1° C.). The result of the testing is provided in TABLE 3-3.

TABLE 3-3

| Description | 60 F. (15.5° C.) temper Avg Hardness kg - 70 F. | 70° F. (21.1° C.) temper Avg Hardness kg - 70 F. | 85° F. (29.4° C.) temper Avg Hardness Kg - 70 F. |
| --- | --- | --- | --- |
| AMGS | 5.82 | 6.12 | 5.48 |
| PGMS | 4.52 | 4.64 | 4.30 |
| Panodan 150K | 5.37 | 4.13 | 3.88 |
| Dimodan HP K-A | 4.62 | 4.88 | 3.68 |

Example 4

Hardness measurements were made using a using a Texture Technologies TA.XT.plus Texture Analyzer. A hydrated laminating fat of the invention was compared to a commercially available margarine (PROMISE LIGHT margarine) and a biscuit roll-in fat composition.

The hydrated laminating fat comprised 63% soybean oil, 25% cotton stearine, 10% water, and 2% AMGS.

PROMISE LIGHT is a 35% vegetable oil spread comprising water, vegetable oil blend (liquid soybean, canola oil, sunflower oil, palm oil, palm kernel oil), whey (from milk), salt, gelatin, vegetable mono and diglycerides, soy lecithin, (potassium sorbate, calcium disodium EDTA), lactic acid, vitamin E, artificial flavor, vitamin A palmitate, beta carotene, vitamin D3, pyridoxine hydrochloride (vitamin B6), and cyanocobalamin (vitamin B12).

The results of the testing are provided in TABLE 4-1.

TABLE 4-1

| Description | Hardness at 70° F. (21.1° C.) (kg) | Hardness at 60° F. (15.5° C.) (kg) |
| --- | --- | --- |
| Hydrated Laminating Fat | 13.6 | 14.0 |
| PROMISE LIGHT margarine | 1.1 | 1.6 |
| Biscuit Roll-in | 11.0 | 15.3 |

As shown in the data, the hardness value for the PROMISE LIGHT margarine is very low in comparison to hydrated laminating fats of the invention. The PROMISE LIGHT margarine is too soft to function as a laminating fat using typical automated dough processing systems.

Example 5

Hardness measurements of certain laminating fats were made using a using a Texture Technologies TA.XT.plus Texture Analyzer. The composition of the anhydrous laminating fat and the hydrated laminating fat are provided in TABLE 5-1. The harness values are provided in TABLE 5-2.

TABLE 5-1

| Ingredient | Anhydous Fat (wt. %) | Hydrated Fat (wt. %) |
|---|---|---|
| Soybean Oil | 71% | 56% |
| Cotton Stearine | 27% | 22% |
| Water | 0% | 20% |
| AMGS | 2% | 2% |
| TBHQ | 0.02% | 0.02% |

TABLE 5-2

| Description | Hardness (kg) |
|---|---|
| Hydrated Laminating Fat | 11.1 |
| Anhydrous Shortening | 10.0 |
| Partially-hydrogenated Crescent Control Shortening | 11.8 |
| Partially-hydrogenated Biscuit Control Shortening | 9.4 |
| Margarine (16% water) | 5.7 |
| Margarine (8.5% water) | 6.4 |

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following embodiments.

What is claimed is:

1. A hydrated laminating fat composition comprising a water-in-oil emulsion comprising:
   (a) a continuous phase consisting essentially of:
      a fully-hydrogenated vegetable oil having a melting point of from 50° C. to 80° C. selected from the group consisting of fully-hydrogenated cottonseed oil, fully-hydrogenated soybean oil, fully-hydrogenated palm oil, fully-hydrogenated palm kernel oil, fully-hydrogenated coconut oil, and mixtures thereof, and a stearine fraction of a vegetable oil having a melting point of from 50° C. to 80° C. selected from the group consisting of cottonseed stearine, soybean stearine, palm stearine, and mixtures thereof in an amount ranging from about 20 wt. % to about 40 wt. % of the hydrated laminating fat composition; and
      a non-hydrogenated liquid vegetable oil in an amount ranging from about 50 wt. % to about 70 wt. % of the hydrated laminating fat composition;
   (b) a dispersed phase comprising water in an amount ranging from about 5 wt. % to about 30 wt. % of the hydrated laminating fat composition; and
   (c) an emulsifier
wherein the hydrated laminating fat composition has a hardness measured at room temperature that ranges from about 5 kg to about 18 kg when measured using the margarine spreadability test using a texture analyzer (TA-XTplus).

2. The hydrated laminating fat composition of claim 1, wherein the fully-hydrogenated vegetable oil has an iodine value of less than about 10.

3. The hydrated laminating fat composition of claim 2, wherein the fully-hydrogenated vegetable oil has an iodine value of less than about 5.

4. The hydrated laminating fat composition of claim 1, wherein the continuous phase comprises a combination of fully-hydrogenated vegetable and stearine fraction of a vegetable oil, in an amount of from about 30 to about 40 weight percent of the hydrated laminating fat composition.

5. The hydrated laminating fat composition of claim 1, wherein the non-hydrogenated liquid vegetable oil is selected from the group consisting of canola oil, corn oil, cottonseed oil, olive oil, palm oil, rapeseed oil, rice bran oil, safflower oil, soybean oil, sunflower oil, and mixtures thereof.

6. The hydrated laminating fat composition of claim 1, wherein the non-hydrogenated liquid vegetable oil comprises canola oil.

7. The hydrated laminating fat composition of claim 1, wherein the non-hydrogenated liquid vegetable oil comprises soybean oil.

8. The hydrated laminating fat composition of claim 1, wherein the emulsifier is present in an amount ranging from about 1 wt. % to about 10 wt. %.

9. The hydrated laminating fat composition of claim 1, wherein the emulsifier is present in an amount ranging from about 1 wt. % to about 5 wt. %.

10. The hydrated laminating fat composition of claim 1, wherein the emulsifier comprises alpha-monoglyceride stearate (AMGS), sorbitan monostearate, diacetyl tartaric acid esters of monoglycerides (DATEM), polyglycerol monostearate (PGMS), polyglycerol polyricinoleate (PGPR), propylene glycol monoesters, sucrose esters, monos/dis, SSL, lecithin, phospholipids, polysorbate esters, monoglyceride blends, or combinations thereof.

11. The hydrated laminating fat composition of claim 1, wherein the hydrated laminating fat composition has a hardness measured at room temperature that ranges from about 80 mm to about 220 mm when measured using AOCS cone penetrometer method (Cc 16-60).

12. The hydrated laminating fat composition of claim 1, wherein the hydrated laminating fat composition has a hardness measured at room temperature that ranges from about 5 kg to about 14 kg when measured using the margarine spreadability test using a texture analyzer (TA-XTplus).

13. The hydrated laminating fat composition of claim 1, wherein the hydrated laminating fat composition has a hardness measured at room temperature that ranges from about 80 mm to about 140 mm when measured using AOCS cone penetrometer method (Cc 16-60).

14. A hydrated laminating fat composition consisting essentially of: (a) about 20 wt. % to about 40 wt. % of a mixture of a fully-hydrogenated fat having a melting point of from 50° C. to 80° C. selected from fully-hydrogenated cottonseed oil, fully-hydrogenated soybean oil, fully-hydrogenated palm oil, fully-hydrogenated palm kernel oil, fully-hydrogenated coconut oil, and mixtures thereof, and a stearine fraction of a vegetable oil having a melting point of from 50° C. to 80° C. selected from cottonseed stearine, soybean stearine, palm stearine, and mixtures thereof; (b) about 50 wt. % to about 70 wt. % non-hydrogenated liquid oil selected from the group consisting of soybean oil, palm oil, and combinations thereof; (c) about 1.0 wt. % to about 3.0 wt. % of an emulsifier; and (d) about 5 wt. % to about 30 wt. % water; wherein the hydrated laminating fat composition is a water-in-oil emulsion exhibiting a Solid Fat Content of about 26 at 92 degrees Fahrenheit.

15. A food composition comprising the hydrated laminating fat composition of claim 1.

16. A dough article comprising the hydrated laminating fat composition of claim 1.

17. The dough article of claim 16, wherein the dough article comprises:
   a plurality of layers of a dough composition; and
   a plurality of layers of the hydrated laminating fat composition;
   wherein the layers of the dough composition are each separated by a layer of the hydrated laminating fat composition.

18. The dough composition of claim 17, wherein the dough article is a puff pastry, biscuit, crescent, croissant, Danish, cinnamon roll, turnover, roll, strudel, breadstick, or corn stick.

19. A method of making a laminated dough comprising the steps of:
   (a) combining a solid fat, a liquid oil, water, and an emulsifier to form a hydrated laminating fat composition in the form of a water-in-oil emulsion comprising:
      (i) a continuous phase consisting essentially of:
         a fully-hydrogenated vegetable oil selected from the group consisting of fully-hydrogenated cottonseed oil, fully-hydrogenated soybean oil, fully-hydrogenated palm oil, fully-hydrogenated palm kernel oil, fully-hydrogenated coconut oil, and mixtures thereof, a stearine fraction of a vegetable oil selected from the group consisting of cottonseed stearine, soybean stearine, palm stearine, and mixtures thereof, or a mixture thereof, in an amount ranging from about 20 wt. % to about 40 wt. % of the hydrated laminating fat composition; and
         a non-hydrogenated liquid vegetable oil in an amount ranging from about 20 wt. % to about 70 wt. % of the hydrated laminating fat composition;
      (ii) a dispersed phase comprising water in an amount ranging from about 5 w % to about 30 wt. % of the hydrated laminating fat composition; and
      (iii) an emulsifier;
   wherein the hydrated laminating fat composition has a hardness measured at room temperature ranging from about 5 kg to about 18 kg when measured using the margarine spreadability test using a texture analyzer (TA-XTplus);
   (b) cooling and crystallizing the hydrated laminating fat composition by passing the hydrated fat composition through a scraped surface heat exchanger;
   (c) applying a layer of the hydrated laminating fat composition from a dispensing apparatus that is fed directly from the scraped surface heat exchanger, without a tempering step, to a layer of a dough composition that comprises flour and water to form a hydrated fat-coated dough layer; and
   (d) by use of an automated dough making process, folding the hydrated fat-coated dough layer one or more times to form a refrigerator stable laminated dough comprising alternating layers of the dough composition and the hydrated laminating fat composition.

20. The method of claim 19 wherein the hydrated laminating fat composition comprises a mixture of fully-hydrogenated palm oil and palm stearine in an amount ranging from about 30 wt. % to about 40 wt. % of the hydrated laminating fat composition.

21. The hydrated laminating fat composition of claim 1 comprising a mixture of fully-hydrogenated palm oil and palm stearine in an amount ranging from about 30 wt. % to about 40 wt. % of the hydrated laminating fat composition.

22. The hydrated laminating fat composition of claim 14 comprising palm stearine.

23. The hydrated laminating fat composition of claim 14 comprising fully-hydrogenated palm oil and palm stearine in the amount ranging from about 30 wt. % to about 40 wt. % of the hydrated laminating fat composition.

24. The hydrated laminating fat composition of claim 1 comprising the non-hydrogenated liquid vegetable oil in an amount ranging from about 60 wt. % to about 70 wt. % of the hydrated laminating fat composition.

25. The hydrated laminating fat composition of claim 1 comprising the non-hydrogenated liquid vegetable oil in an amount ranging from about 50 wt. % to about 60 wt. % of the hydrated laminating fat composition.

26. The hydrated laminating fat composition of claim 1 wherein the hydrated laminating fat composition exhibits a Solid Fat Content of about 26 at 92 degrees Fahrenheit.

27. The hydrated laminating fat composition of claim 1 containing less than about 30 weight percent saturated fatty acids.

28. The hydrated laminating fat composition of claim 1 wherein the non-hydrogenated liquid vegetable oil contains less than 5 wt. % trans fatty acids.

* * * * *